Patented Feb. 6, 1934

1,945,963

UNITED STATES PATENT OFFICE 1,945,963

PECTIN PREPARATION

Willard E. Baier and Robert E. Harris, Ontario, Calif., assignors to California Fruit Growers Exchange, Los Angeles, Calif., a corporation of California No Drawing. Application September 8, 1930
Serial No. 480,621

9 Claims. (Cl. 99—11)

This invention relates to an improved pectin preparation capable of being readily and rapidly dispersed in aqueous media without the formation of lumps or undesirable frothing.

Generally, this invention comprises an improvement over the inventions disclosed in U. S. Patent #1,611,528 granted December 21, 1926, to Jameson for pectin product and process of producing it. In that patent is set forth a method by which pectin preparations have been made effervescent and therefore soluble without lumping. This is accomplished by the addition of suitable amounts of a carbonate or bicarbonate and an acid.

It is well known that when ordinary solid pectin preparations are stirred into water or other aqueous media, they will, unless some dispersing aid be used, form mucilaginous clumps or gummy aggregates that are broken up and dissolved with great difficulty. The problem of dispersion or solution of pectin in aqueous media has received the attention of several inventors and is well stated by Herbert T. Leo in Patent #1,646,157, where the patentee states:

"Pectin is by nature a gum and when wetted on the outer surface it requires much agitation to get it into solution. However, when powdered or granular and added to water, or when water is added to it, it immediately forms into hard, difficultly soluble lumps which take much unnecessary agitation to get into solution. This inherent property of pectin or pectous substances has always been the bug-bear of manufacturers."

Jameson, in Patent #1,611,528 referred to above, provides an effective means for overcoming the tendency towards lumping. When pectin preparations are made effervescent and thereby soluble without lumping, by the addition of a carbonate or bicarbonate and an acid, an excess of acid is necessary in order that any possible alkalinity in the mixture may not injure the pectin during storage. Even under such conditions it has sometimes been deemed advisable to coat the particles of one or more of the components with a waxy material to prevent detrimental action during storage. Even then the dispersion does not take place as rapidly as desirable under certain conditions.

The residual end product of an effervescent salt-acid mixture is a buffer salt, for example, sodium citrate. The effect of this buffer is to very considerably retard or prolong the time of set of a jelly or preserve made with the pectin preparation.

We have discovered that it is possible to produce an effervescent pectin preparation that will leave no residual product when the pectin has been dispersed. We accomplish this by using as the effervescent material, which is incorporated in the pectin preparation, a substance which in the presence of heat and/or moisture, will be decomposed to liberate an expansive material such as gas, and a volatile residue. As illustrative of substances capable of thus decomposing to form a gas and a volatile residue, mention may be made of acetonedicarboxylic acid.

Furthermore, we have discovered that the relative particle size of the pectin and of the effervescent material plays an important part in the ease of dispersion of the pectin in a liquid. In general, it has been found that when the effervescent material (be it a carbonate or bicarbonate and an acid, or an effervescent material decomposing into a gas and a volatile residue) is not substantially coarser in particle size than the pectin, the dispersion of the pectin in the liquid is facilitated. For example, it has been found that when the effervescent material is of the same or finer particle size than the pectin, the dispersion not only takes place in a shorter period of time but moreover it is not accompanied by frothing which may cause the entire mass to boil over and thereby occasion loss of ingredients as well as a frothy final product.

Accordingly, an object of this invention is to provide an effervescent pectin preparation which will, after the preparation has been dispersed, contain no residue arising from the effervescent material.

A further object of this invention is to disclose and provide a soluble pectin preparation containing an effervescent material which is decomposable by heat and/or moisture to liberate a gas and a volatile residue.

Another object is to disclose and provide a pectin preparation containing acetonedicarboxylic acid in intermixture therewith.

A still further object is to disclose and provide a pectin preparation containing pectin and an effervescent material, the particle sizes of said pectin and effervescent material bearing a certain desirable relation to each other whereby the dispersion of the pectin preparation in the liquid media is facilitated.

Still further objects and advantages will become obvious to those skilled in the art from a contemplation of the invention as set forth hereinafter and in the appended claims.

For purposes of illustration, the subsequent detailed description of our invention will relate to the use of acetonedicarboxylic acid in a pectin preparation.

Acetonedicarboxylic acid, $CO(CH_2COOH)_2$, is decomposed by heat and especially in the presence of moisture, to liberate the inert gas, carbondioxide, and acetone. Acetone, having a boiling point of about 56.5° C. will, of course, be volatilized from any hot mixture.

In employing the invention, a suitable amount of acetonedicarboxylic acid is mixed with a solid pectin preparation. The effervescent material such as acetonedicarboxylic acid, may, of course, be employed in rather widely varying proportions but preferably in substantially minor proportions, and we have found that five to ten percent by weight, of the weight of the pectin, gives quite satisfactory results. Any suitable method of mixing may be employed that will give a fairly thorough and fairly uniform intermixture. The pectin mixture may also contain an edible acid for the purpose of acidifying a proposed jelly mix as well as coloring, flavoring and other ingredients, all according to the intended uses of the pectin preparation. Where desirable, as when it is important that succeeding batches have a uniform jelly grade, any suitable standardizing material may be employed.

As may be expected, an increase in the quantity of the effervescent material added to the pectin preparation reduces the dispersing time.

When the prepared pectin mixture is to be dispersed, warm or hot aqueous media are preferably employed since we find these to give more satisfactory results. The prepared mixture is stirred quickly into hot water whereupon the acetonedicarboxylic acid is rapidly decomposed, evolving carbon dioxide which thoroughly disperses the pectin and effectively prevents the clumping referred to above. The acetone formed is volatilized and escapes from the mixture. When very hot water or other medium such as sugar solution, fruit juices, and the like, is employed, the rapid volatilization of the acetone assists in the dispersion of the pectin. The resultant solution or pectin sol may then be put to any of the various uses for which it is suited.

An important object of this invention is the fact that it permits the production of an easily soluble effervescent pectin preparation which will not leave a buffer or other residual sol in the pectin solution. Whenever the presence of a buffer salt would be detrimental, the pectin solution resulting from the improved pectin preparation gives rise to an important advantage which previously could not be attained. An added buffer salt may, of course, be employed in conjunction with our invention if desired.

For some uses it is important to have a buffer salt such as sodium citrate in the mixture and under such circumstances, our invention comprises the employment of a buffer salt in conjunction with the other desired ingredients.

In the preparation of certain emulsions a sol of pectin is made first. Acetonedicarboxylic acid can be employed under these conditions to very good advantage as an effervescent substance, and the acetone may then be boiled off or left in the sol. The residual buffer salt left by the effervescent mix used in the prior art is oftentimes an undesirable constituent of the emulsion and in certain instances is detrimental to the stability of the emulsion. This is a difficulty which this invention obviates completely while still retaining the advantages of effervescence and ready solubility.

Another important advantage resulting from the use of this invention resides in the fact that the total carbondioxide of acetonedicarboxylic acid, all of which is available, is about 60.2 percent by weight, whereas that of a salt-acid type of mixture composed, for instance, of sodium bicarbonate and citric acid, is only about 28.5 percent. Thus a considerably smaller quantity of an effervescent material such as acetonedicarboxylic acid, would give an equal amount of carbondioxide.

A further advantage of this invention is the fact that when preparations in which it is used are stored, there can be no detrimental action on the pectin by any basic substance since there is no basic salt present. Acetonedicarboxylic acid is, moreover, a weak acid and will not therefore harm the pectin on the acid side.

While specific reference has been made hereinabove to the employment of acetonedicarboxylic acid, the invention is obviously not limited thereto but is applicable in the utilization of any suitable material which may be mixed with pectin without detriment to the same and which is decomposable by heat and moisture into a gas and a volatile residue. Any such material should, of course, be non-toxic in the proportions employed.

Furthermore, we have found that the quantity of effervescent salt necessary to be added to a pectin preparation so as to permit dispersion in a given time, say a minute and a half, may be reduced by regulating the relative particle sizes of the effervescent material and the pectin. For example, if the effervescent material such as acetonedicarboxylic acid, is of finer or smaller particle size than the particle size of the pectin, the dispersion is greatly facilitated and the time required for dispersion is reduced by such decrease in particle size of the effervescent material.

If, for example, the pectin is of particle size between 70 and 80 mesh and the effervescence material is 100 mesh, the time required for dispersion is about one minute. If, however, the pectin is of 100 mesh and the effervescent material of 100 mesh, then the time required for dispersion is about three minutes. Furthermore, by employing an effervescent material of particle size finer or not appreciably coarser than the particle size of the pectin, the frothing which occurs when the effervescent material is coarser than the pectin is obviated.

The increase in the effectiveness of effervescent materials in pectin preparations by reducing their particle size, occurs not only when effervescent materials such as acetonedicarboxylic acid, are used but is also noticed when salt acid mixtures are employed as the effervescent substance.

This invention, therefore, produces a pectin preparation capable of being readily dispersed in liquid media by reason of relative particle sizes of effervescent materials and pectin as well as by reason of a particular class of effervescent materials, namely, materials which decompose to form a gas and volatile residue.

All such changes and modifications as come within the scope of the appended claims are embraced thereby.

What we claim is:

1. A substantially dry, finely divided pectin product containing an effervescent material adapted to decompose in the presence of an aqueous medium to liberate a gas and a volatile residue.

2. An effervescent pectin preparation comprising pectin and a material capable of decomposing in the presence of heat and moisture into a gas and a volatile residue.

3. A substantially, dry, finely divided pectin product containing acetonedicarboxylic acid.

4. A substantially dry, finely divided pectin product containing pectin and acetonedicarboxylic acid, the acetonedicarboxylic acid being not coarser than said pectin.

5. A pectin preparation comprising finely divided pectin, a standardizing material, a buffer salt and acetonedicarboxylic acid.

6. A pectin preparation comprising pectin, a buffer salt and acetonedicarboxylic acid.

7. An effervescent pectin preparation consisting of a finely divided pectin, a buffer salt and a non-toxic material capable of decomposing in the presence of heat and moisture into a relatively inert gas and a readily volatile residue.

8. A substantially dry, finely divided pectin product containing pectin and an effervescent material adapted to decompose in the presence of an aqueous medium to liberate a gas and a volatile residue, said effervescent material being not coarser than said pectin.

9. A substantially dry, finely divided pectin product containing pectin, a buffer salt, and an effervescent material adapted to decompose in the presence of an aqueous medium to liberate a gas and a volatile residue.

WILLARD E. BAIER.
ROBERT E. HARRIS.